Feb. 22, 1938.  W. W. MacDONALD  2,109,177
TRUCK
Filed Nov. 2, 1935  2 Sheets-Sheet 1
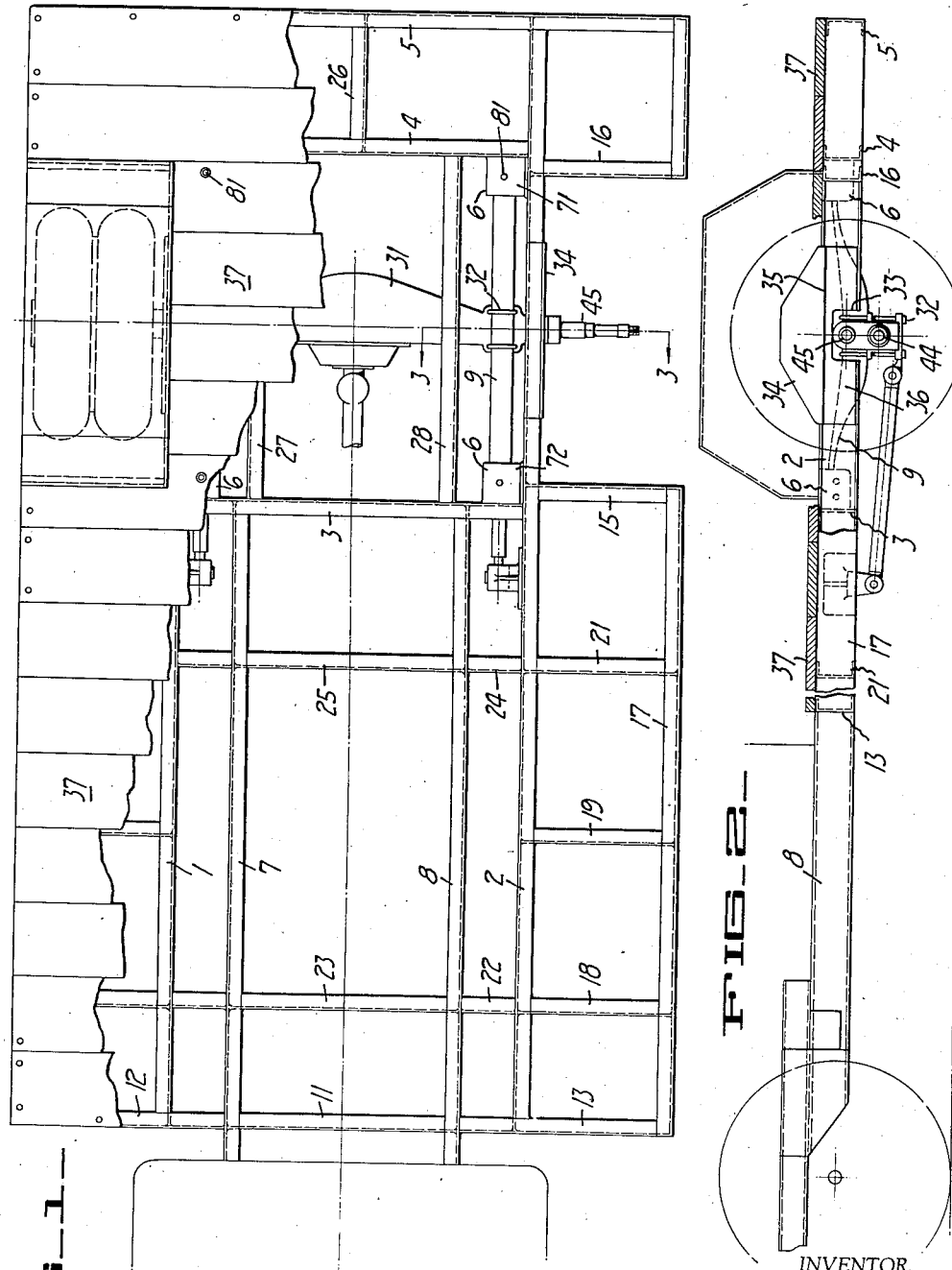
INVENTOR.
William W. MacDonald
BY
ATTORNEY.

Feb. 22, 1938.                    W. W. MacDONALD                    2,109,177
                                       TRUCK
                                  Filed Nov. 2, 1935                 2 Sheets-Sheet 2
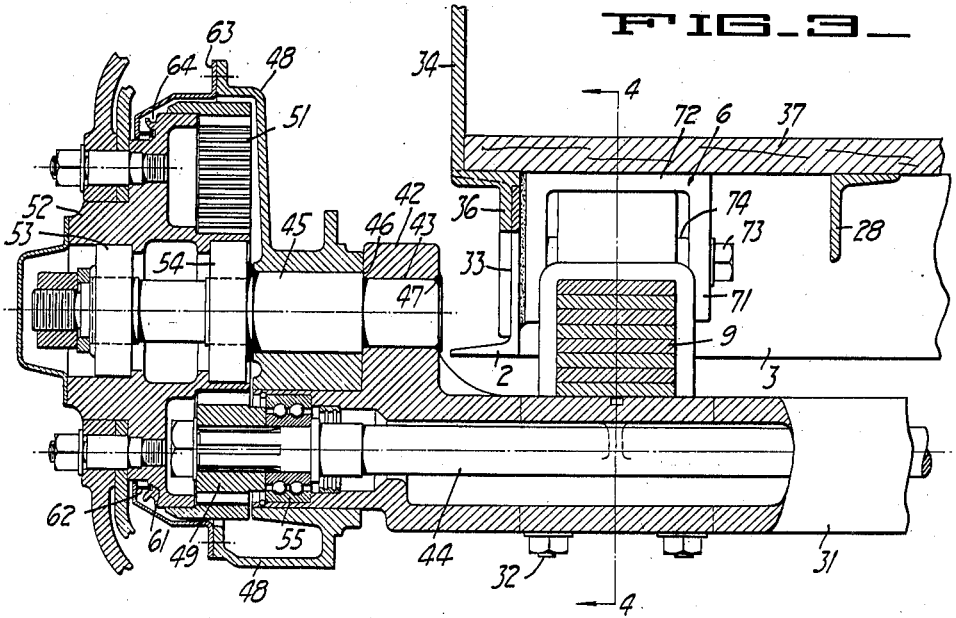
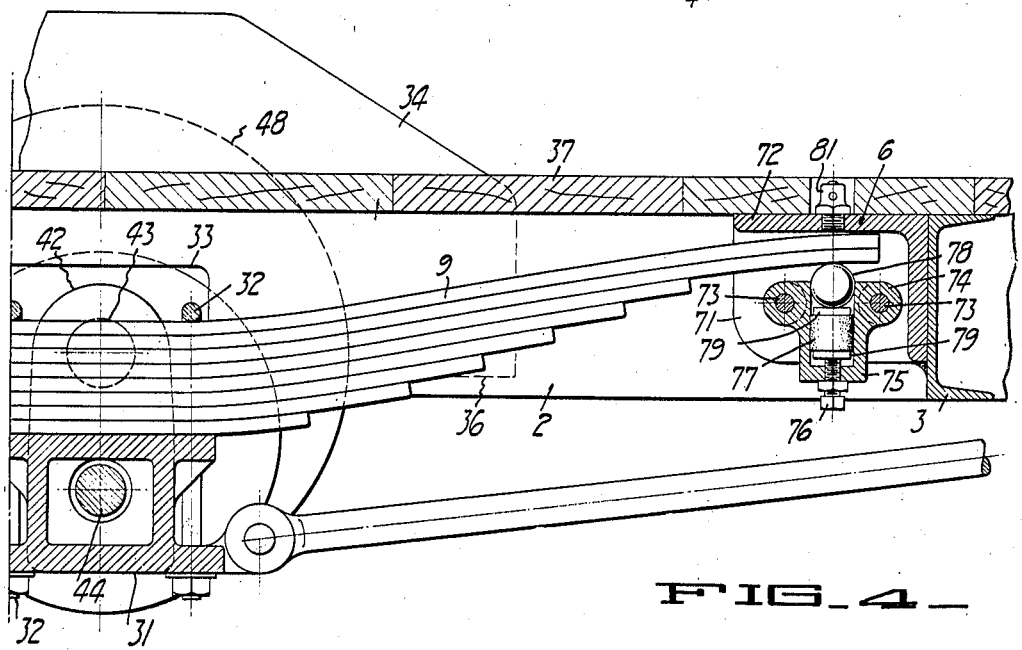
INVENTOR.
William W. MacDonald
BY
ATTORNEY.

Patented Feb. 22, 1938

2,109,177

UNITED STATES PATENT OFFICE 2,109,177

TRUCK

William W. MacDonald, Mountain View, Calif., assignor to Max L. Rosenfeld, San Francisco, Calif.

Application November 2, 1935, Serial No. 47,931

4 Claims. (Cl. 280—106.5)

This invention relates to low bed heavy duty trucks. Two of the essentials of a truck designed for heavy duty are (a) that the loading platform be kept as low as possible without diminishing the required road clearance, and (b) that substantially the maximum overall width of a vehicle permitted by state laws be made available for loading purposes without resorting to loading platforms having two or more levels. These conditions should of course be met without decreasing the requisite strength of the chassis or frame, and in this connection it should be borne in mind that heavy duty trucks are as a rule not provided with bodies, and consequently the frame must of itself be sufficiently rigid to withstand distortion.

One of the objects of this invention is the provision of a rigid, low-bed heavy-duty truck chassis.

Another object of the invention is the provision of a simplified jack shaft and spindle assembly by means of which the bed of a vehicle may be maintained close to the ground.

Still another object of the invention is the provision of a spring carrier assembly which permits flexibility of movement of the vehicle springs, and enables the bed of the vehicle to be maintained close to the ground.

Another object of the invention is the provision of a new and novel oil seal between the wheel hub and its associated oil hood.

The invention possesses other advantageous features, some of which with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a plan view of the frame of a heavy duty truck with part of the loading platform broken away to more clearly disclose the object of my invention.

Figure 2 is a side elevation of the frame illustrated in Figure 1.

Figure 3 is a vertical section taken on the line 3—3 of Figure 1.

Figure 4 is a section taken on the line 4—4 of Figure 3.

As illustrated in Figure 1 a single deck loading platform of maximum width between the rear wheels is obtained by means of a pair of spaced parallel load rails 1 and 2, extending the full length of the loading platform, and interconnected by means of a pair of spaced cross rails 3 and 4, and by a rear end rail 5 defining the width of the loading platform. Welded to the inner corners of the rectangle formed by the rails 1, 2, 3 and 4 are spring carriers 6 which also serve to make the frame more rigid. Welded to the cross rail 3 at spaced points substantially in line with the inner faces of the spring carriers 6, are a pair of main rails 7 and 8 extending forward beyond the front end of the load rails 1 and 2, in parallelism therewith to form the neck of the frame and to support the engine. It will therefore be seen that the main rails 7 and 8 together with the load rails 1 and 2 and the cross rail 3, may be considered as forming interior offsets within which the springs 9 are adapted to lie. The springs 9 may also be considered as lying within the load rails 1 and 2, and the rearward continuation of lines defined by the main rails 7 and 8. Extending between the main rails 7 and 8 in line with the forward ends of the load rails 1 and 2 is a forward end rail 11, and extending outwardly from the main rails 7 and 8 in line with the forward end rail 11 are rails 12 and 13 welded to the load rails 1 and 2. Extending outwardly from the load rails 1 and 2 from points substantially in line with the spring carriers 6, are a pair of cross rails 15 and 16 which define with the load rails 1 and 2, rectangular recesses for accommodating the rear wheels of the vehicle. Extending between the outer ends of the rails 13 and 15 and welded thereto are side rails 17.

Extending between the load rail 2 and the side rail 17 are a number of spaced stiffening cross rails 18, 19 and 21. A cross rail 22 in line with the cross rail 18, extends between the load rail 2 and the main rail 8 and a cross rail 23 in line with the rails 18 and 22, extends between the main rails 7 and 8. In the same manner a cross rail 24 in line with the cross rail 21, extends between the load rail 2 and the main rail 8 and a cross rail 25 in line with the rails 21 and 24 extends between the main rails 7 and 8. Extending between the cross rail 4 and the rear end rail 5 intermediate their ends, is a central rail 26. Extending between the cross rails 3 and 4 are a pair of spaced angle iron floor rails 27 and 28. All of the rails above referred to with the exception of rails 27 and 28 are formed of channels, and all joints are made by welding.

Since the frame is symmetrical with respect to its center line it is felt that the above description of the lower half of Figure 1 sufficiently illustrates the construction involved without the necessity of detailing the upper half.

Centrally located within the rectangle formed by the rails 1, 2, 3 and 4 is an axle housing 31 to the outer ends of which are secured the leaf springs 9, by means of the usual U-bolts 32. The lower edges of the load rails 1 and 2 are notched as at 33 to receive the rear wheel spindles of the vehicle, and to compensate for this weakening they are reinforced by stiffening plates 34. As shown in Figure 3 the stiffening plate 34 is provided with an inwardly extending flange 35, the free end of which is adapted to seat on the upper edge of the web of the rail 2, and with a depending leg 36 adapted to engage the inner face of the web. By following this construction it will be seen that the wooden flooring 37 may be extended over the flange 35, thereby taking advantage of the width of the rails 1 and 2.

In order to maintain the bed of the truck as low as possible resort is made to the jack shaft and spindle assembly as shown in Figure 3. Extending upwardly from the outer end of the axle housing 31 is a bracket 42 provided with a non-tapered or straight bore 43, the axis of which lies in a plane passing through the axis of a jack shaft 44, accommodated in the axle housing 31. Seated in the bore 43 is a wheel spindle 45, provided with a shoulder 46 adapted to abut the outer face of the bracket 42. Preferably the spindle 45 is secured in its position merely by means of a weld 47. Seated over the outer free end of the axle housing 31 and the intermediate portion of the spindle 45 is a gear housing 48, within which is adapted to rotate a pinion 49 splined to the end of the jack shaft 44, and a ring gear 51 in mesh with the pinion 49 and secured to the wheel hub 52. The wheel hub 52 is journaled on the wheel spindle 45 by means of bearings 53 and 54, and the jack shaft 44 is journaled within the axle housing 31 by means of bearings 55 which preferably support the jack shaft just beneath the upper wall of the housing. Since the pinion 49 is arranged to mesh with the ring gear 51 it will be obvious that the rotary motion of the jack shaft 44 will be transmitted to the wheel hub 52. The important features of this construction are (a) that the wheel spindle 45 is disposed directly above the jack shaft 44, thereby keeping the axle housing and the truck frame as low as possible and (b) that the wheel spindle 45 is secured to the axle housing 31 in a very simple and positive manner which permits of its ready removal.

Formed on the outer face of the wheel hub 52 is a peripheral channel 61 adapted to loosely receive an inwardly extending flange 62 formed integral with or as a part of an oil hood 63 bolted or otherwise secured to the gear housing 48. Just outwardly of the channel 61 is an outwardly facing oil channel 64. Ordinarily any oil leaking outwardly past the ring gear 51 goes no farther than the oil channel 64 and due to the rotation of the hub 52 any oil received in the channel 64 is forced to travel outwardly over the ring gear. However, if by any chance some oil should pass the channel 64 it can go no farther than the flange 62.

Another expedient resorted to in order to maintain the bed of the truck as low as possible, is the spring carrier assembly shown in Figure 4. This assembly comprises an open ended spring carrier 71 provided with a ceiling 72. Secured to the opposed lateral walls of the spring carrier 71 by means of bolts 73 passing through lugs 74 is a cup shaped spring retainer 75. The base of the spring retainer is provided with a set screw 76 by means of which the vertical position of a rubber cushion 77 may be adjusted as desired to regulate the elevation of a ball bearing 78, seated on the cushion 77. The upper and lower ends of the cushion 77 are provided with metallic washers 79 to prevent direct contact of the ball bearing 78 with the rubber cushion 77. Extending through the flooring 37 and the ceiling 72 of the spring retainer is a grease or oil fitting 81 for lubricating the upper face of the leaf spring 9 the ends of which extend between the ceiling 72 and the ball bearing 78. This construction has two advantages; in the first place it eliminates the necessity of the usual spring shackles, thereby making it possible to lower the frame of the vehicle by several inches, and in the second place due to the single point contact of the ball bearing 78 with the lower face of the spring 9, a rocking motion of the spring is permitted as well as longitudinal movement.

From the above description it will be observed that a low-bed, single-deck heavy duty truck has been provided in which all available space between the rear wheels has been utilized for the loading platform. All bends in the main rails have been eliminated and the frame has been so constructed that a very rigid structure is obtained. The jack shaft and spindle assembly and in particular the elimination of the usual tapered connections between the spindle and axle housing provides a simple, rigid construction in which the spindle may be easily removed by merely cutting its welded joint with the axle housing.

I claim:

1. A vehicle frame comprising: a pair of spaced parallel load rails forming a part of a loading platform; a pair of spaced parallel forward and rear cross rails extending between said load rails; spring receivers secured in each of the four corners defined by said load and cross rails; and a pair of spaced parallel main rails extending within said load rails and secured at their rear ends to said front cross rail, the main rails being spaced from the load rails so as to lie just inside the spring receivers.

2. A vehicle chassis comprising: a pair of spaced parallel load rails forming a part of a loading platform; spaced forward and rear cross rails extending perpendicularly between said load rails and defining therewith a rectangle adapted to overlie the axle housing of the vehicle; spring carriers secured within the four inner corners of said rectangle; a pair of main rails secured to the forward cross rail at spaced points within the forward spring carriers and extending beyond and in parallelism with the forward ends of said load rails; and cross rails secured between the forward ends of said load rails and said main rails.

3. A vehicle chassis comprising: a pair of spaced parallel load rails forming a part of a loading platform; forward and rear cross rails extending perpendicularly between said load rails so as to form therewith a rectangle adapted to overlie the axle housing of the vehicle; spring carriers secured within the four corners of said rectangle; a pair of main rails secured to the forward cross rail at spaced points within the forward spring carriers and extending beyond and in parallelism with the forward ends of said load rails; and forward and rear end rails secured across and extending beyond said load rails to define the width of said loading platform.

4. A vehicle frame comprising: a pair of spaced parallel load rails forming a part of a loading platform; forward and rear cross rails secured to and extending between said load rails at the rear end of said frame; a pair of spaced parallel main rails secured to said forward cross rail and extending forward thereof in parallelism with said load rails; and a pair of vehicle springs secured within the four corners formed by said load rails and forward and rear cross rails immediately adjacent to and in parallelism with said load rails.

WILLIAM W. MacDONALD.